United States Patent
Wang et al.

(10) Patent No.: US 10,235,208 B2
(45) Date of Patent: Mar. 19, 2019

(54) TECHNIQUE FOR SAVING AND RESTORING THREAD GROUP OPERATING STATE

(71) Applicant: NVIDIA Corporation, Santa Clara, CA (US)

(72) Inventors: Nicholas Wang, Saratoga, CA (US); Lacky V. Shah, Los Altos Hills, CA (US); Gerald F. Luiz, Los Gatos, CA (US); Philip Alexander Cuadra, San Francisco, CA (US); Luke Durant, Santa Clara, CA (US); Shirish Gadre, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 161 days.

(21) Appl. No.: 13/711,093

(22) Filed: Dec. 11, 2012

(65) Prior Publication Data

US 2014/0165072 A1     Jun. 12, 2014

(51) Int. Cl.
    *G06F 9/46*     (2006.01)
    *G06F 9/50*     (2006.01)

(52) U.S. Cl.
    CPC ............ *G06F 9/5016* (2013.01); *G06F 9/461* (2013.01)

(58) Field of Classification Search
    CPC ................................ G06F 9/5016; G06F 9/461
    See application file for complete search history.

(56) References Cited

U.S. PATENT DOCUMENTS

| | | | |
|---|---|---|---|
| 6,993,540 B2 * | 1/2006 | Hudson | G06F 12/0269 |
| 8,024,505 B2 * | 9/2011 | Dahlstedt | G06F 9/52 |
| | | | 707/820 |
| 8,752,018 B2 * | 6/2014 | Jones | G06F 9/52 |
| | | | 717/124 |
| 2001/0039609 A1 | 11/2001 | Houldsworth | |
| 2003/0233392 A1 * | 12/2003 | Forin | G06F 9/485 |
| | | | 718/107 |
| 2005/0198079 A1 * | 9/2005 | Heeb | G06F 8/443 |
| 2006/0026407 A1 * | 2/2006 | Chauvel | G06F 9/30174 |
| | | | 712/228 |
| 2010/0162247 A1 * | 6/2010 | Welc | G06F 9/466 |
| | | | 718/101 |
| 2011/0238713 A1 | 9/2011 | Garst, Jr. et al. | |
| 2015/0006843 A1 * | 1/2015 | Moser | G06F 12/0253 |
| | | | 711/170 |

FOREIGN PATENT DOCUMENTS

| | | |
|---|---|---|
| CN | 1894673 A | 1/2007 |
| GB | 2491490 A | 5/2012 |
| WO | WO 01/61471 | * 8/2001 |

* cited by examiner

*Primary Examiner* — Camquy Truong
(74) *Attorney, Agent, or Firm* — Artegis Law Group, LLP

(57) ABSTRACT

A streaming multiprocessor (SM) included within a parallel processing unit (PPU) is configured to suspend a thread group executing on the SM and to save the operating state of the suspended thread group. A load-store unit (LSU) within the SM re-maps local memory associated with the thread group to a location in global memory. Subsequently, the SM may re-launch the suspended thread group. The LSU may then perform local memory access operations on behalf of the re-launched thread group with the re-mapped local memory that resides in global memory.

28 Claims, 6 Drawing Sheets

TECHNIQUE FOR SAVING AND RESTORING THREAD GROUP OPERATING STATE

BACKGROUND OF THE INVENTION

Field of the Invention

The present invention relates generally to single-instruction, multiple-data (SIMD) processing and, more specifically, to a technique for saving and restoring thread group operating state.

Description of the Related Art

In a conventional SIMD architecture, a parallel processing unit (PPU) may execute multiple groups of threads simultaneously, where each thread within a group executes the same instructions on a different portion of input data. A given thread typically relies on various memory resources while executing the instructions, including local memory, shared memory, registers, and so forth. The state of these memory resources is referred to as the "operating state" of the thread.

Under some circumstances, the PPU may save the operating state of a given group of threads in order to re-allocate the memory resources consumed by those threads to another group of threads. When such a situation occurs, a conventional PPU may simply copy the operating state of each thread in the group of threads to memory. Subsequently, the PPU may then re-launch the group of threads by copying the operating states of each thread from memory back to the corresponding memory resources. With this approach, the PPU is capable of "pausing" a group of threads mid-execution in order to launch another group of threads that consume the same resources as the "paused" group of threads.

However, the above approach is problematic because the speed with which the operating state of a given thread may be copied is dependent on the size of that operating state. When a given group of threads includes a large number of threads, and the operating state of each thread is relatively large, copying the operating state for every thread within that thread group multiple times may require a significant amount of computational resources. Consequently, the overall processing throughput of the PPU may decrease dramatically.

Accordingly, what is needed in the art is a more efficient technique for saving and restoring the operating states associated with different groups of threads in a parallel processing system

SUMMARY OF THE INVENTION

One embodiment of the present invention sets forth a computer-implemented method for saving an operating state associated with a group of threads executing on a processor, including determining that a first portion of memory allocated to a first group of threads resides within a first memory region, allocating a second portion of memory within a second memory region, copying the first portion of memory to the second portion of memory, and recording a pointer to the second portion of memory, where the processing engine is configured to perform memory access operations associated with the first group of threads based on the pointer to the second portion of memory.

One advantage of the disclosed technique is that, when restoring the operating state of a group of threads, the processing engine is not required to copy the local memory associated with the group of threads back to a local memory resource previously associated with the group of threads, thereby conserving computational resources associated with the processing engine.

A second advantage is that subsequent save operations can reuse the second portion of memory, saving copies during the subsequent save operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
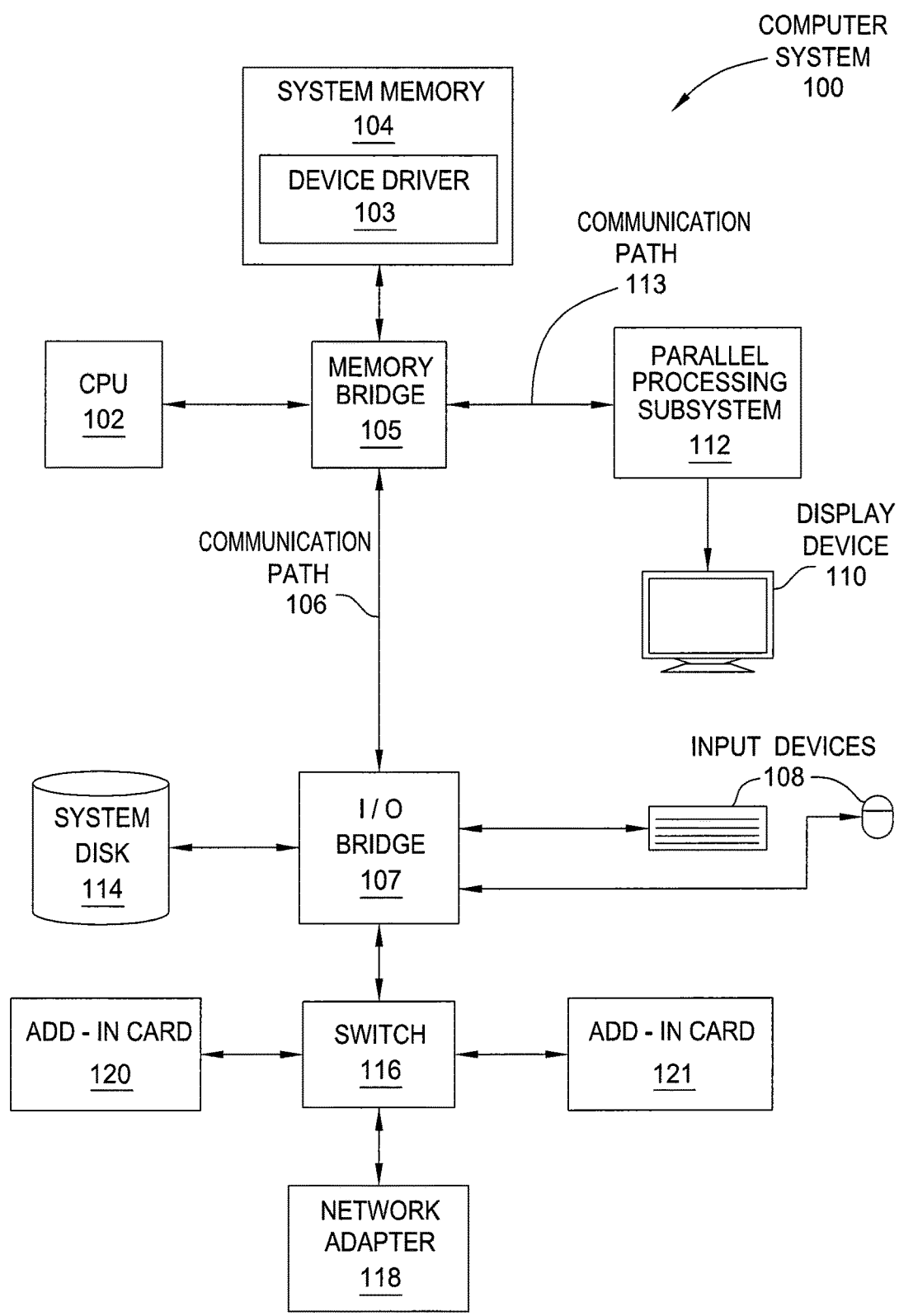
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
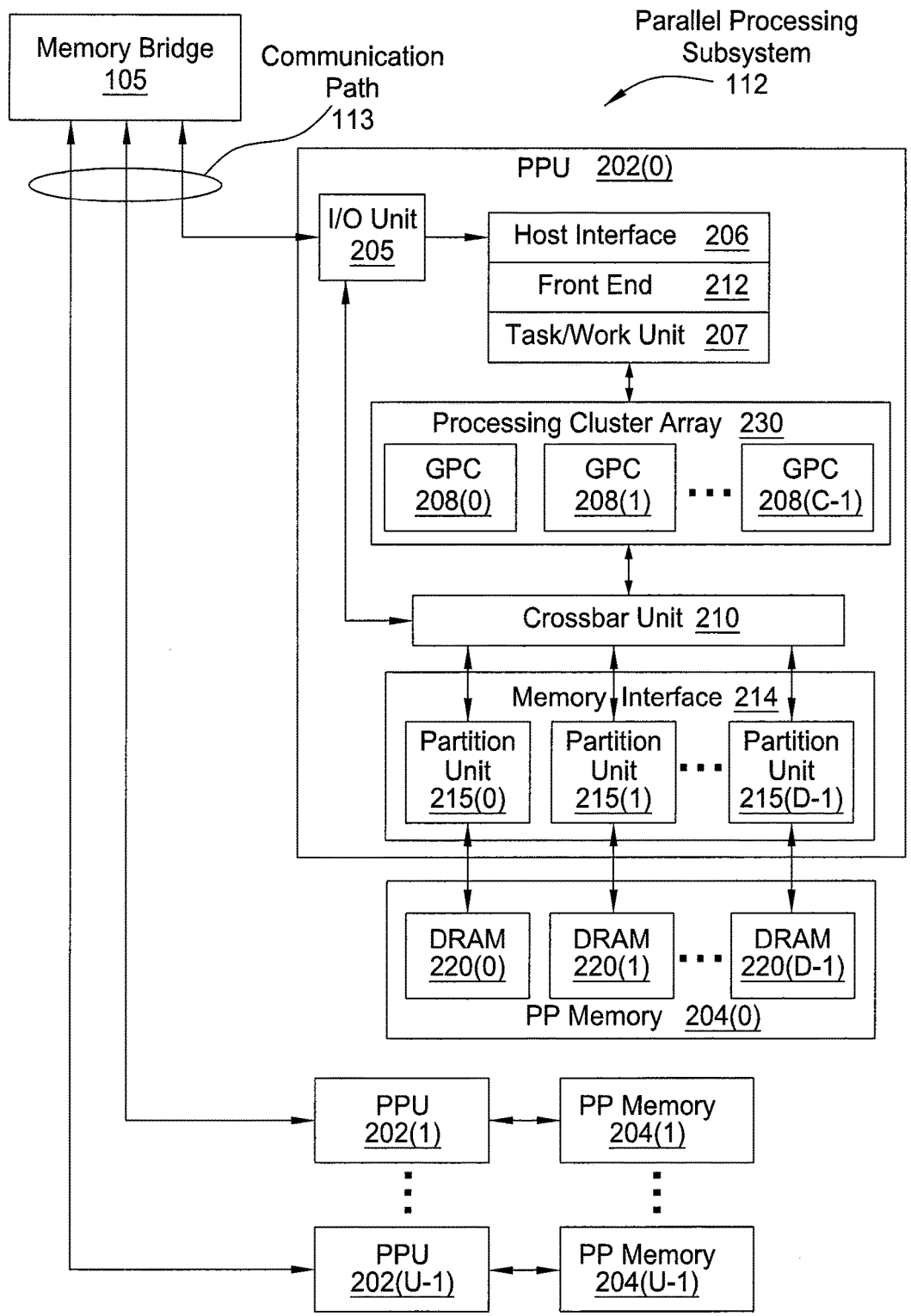
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U>=1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202.

In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
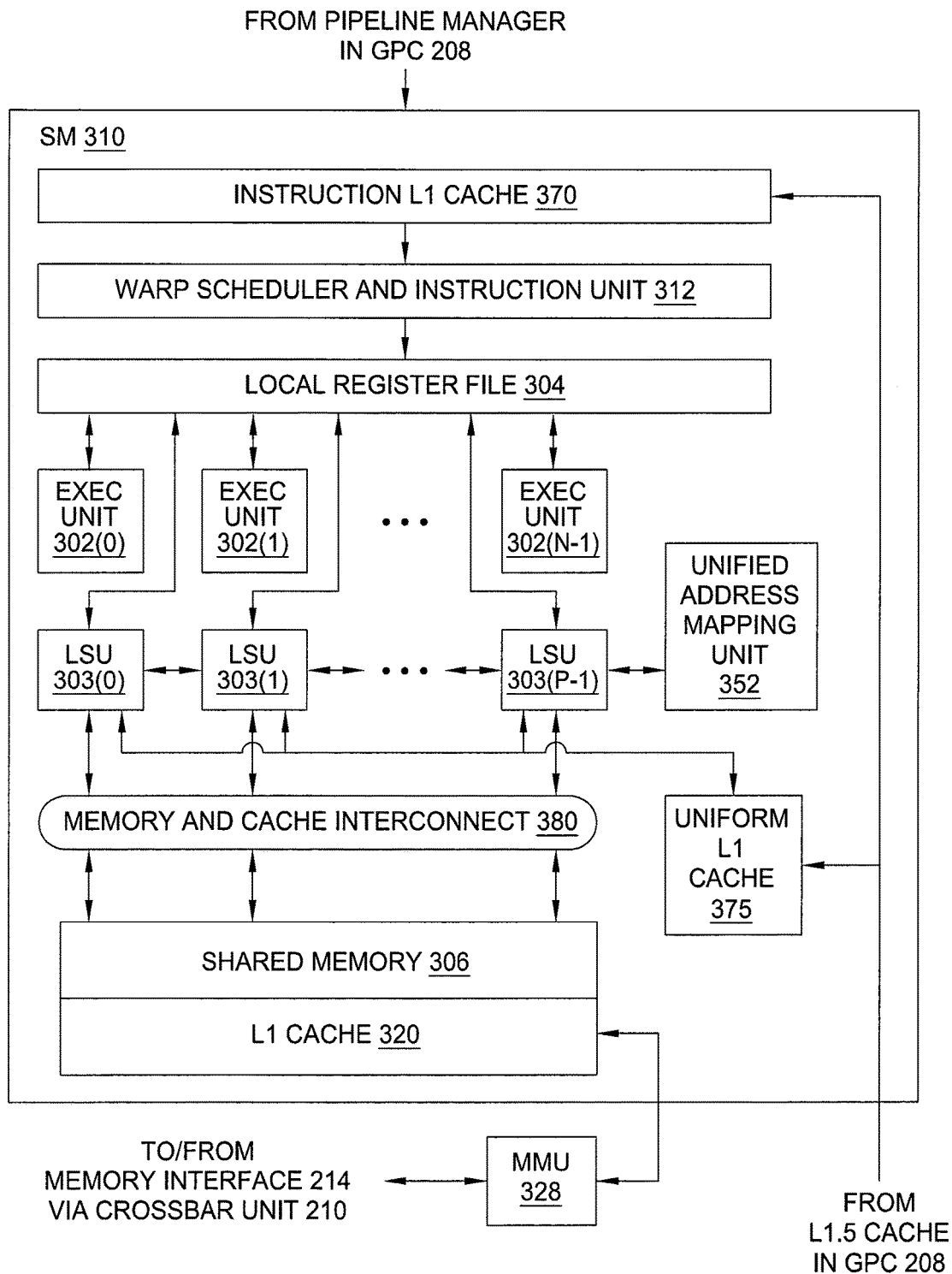
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

As mentioned above, SM 310 is configured to support the execution of multiple related thread groups included within a particular CTA, where each thread group includes multiple threads. Each thread within a given thread group is configured to perform processing operations using a private, per-thread memory resource, as also mentioned. The private, per-thread memory resource for threads within a given thread group is referred to herein collectively as "local memory" associated with that thread group and may include local register file 304, among other memory resources. Local memory for a given thread group resides at a base memory address associated with the thread group, referred to herein as "local memory base" or, alternatively, "LMEM base." In one embodiment, local memory resides within a hardware-managed memory resource by default.

Under certain circumstances, SM 310 may suspend the operation of a CTA and then launch a new CTA "in place" of the suspended CTA, i.e. using similar functional resources. In doing so, SM 310 is configured to save the operating state of the CTA by re-mapping local memory associated with thread groups within the suspended CTA to global memory. SM 310 is also configured to update the LMEM base associated with each such thread group to reflect the location of the re-mapped local memory. SM 310 manages re-mapped local memory associated with thread groups within a suspended CTA using a pointer table that stores, for each thread group, the updated LMEM base.

SM 310 is also configured to subsequently restore the operating state of a suspended CTA by re-launching thread groups within that CTA on the functional units within SM 310. SM 310 is also configured to retrieve the updated LMEM base for each re-launched thread group and to then perform memory access operations for those thread groups with the updated LMEM base, as described in greater detail below in conjunction with FIG. 4-6.

Saving and Restoring Thread Group State

Figure 4:
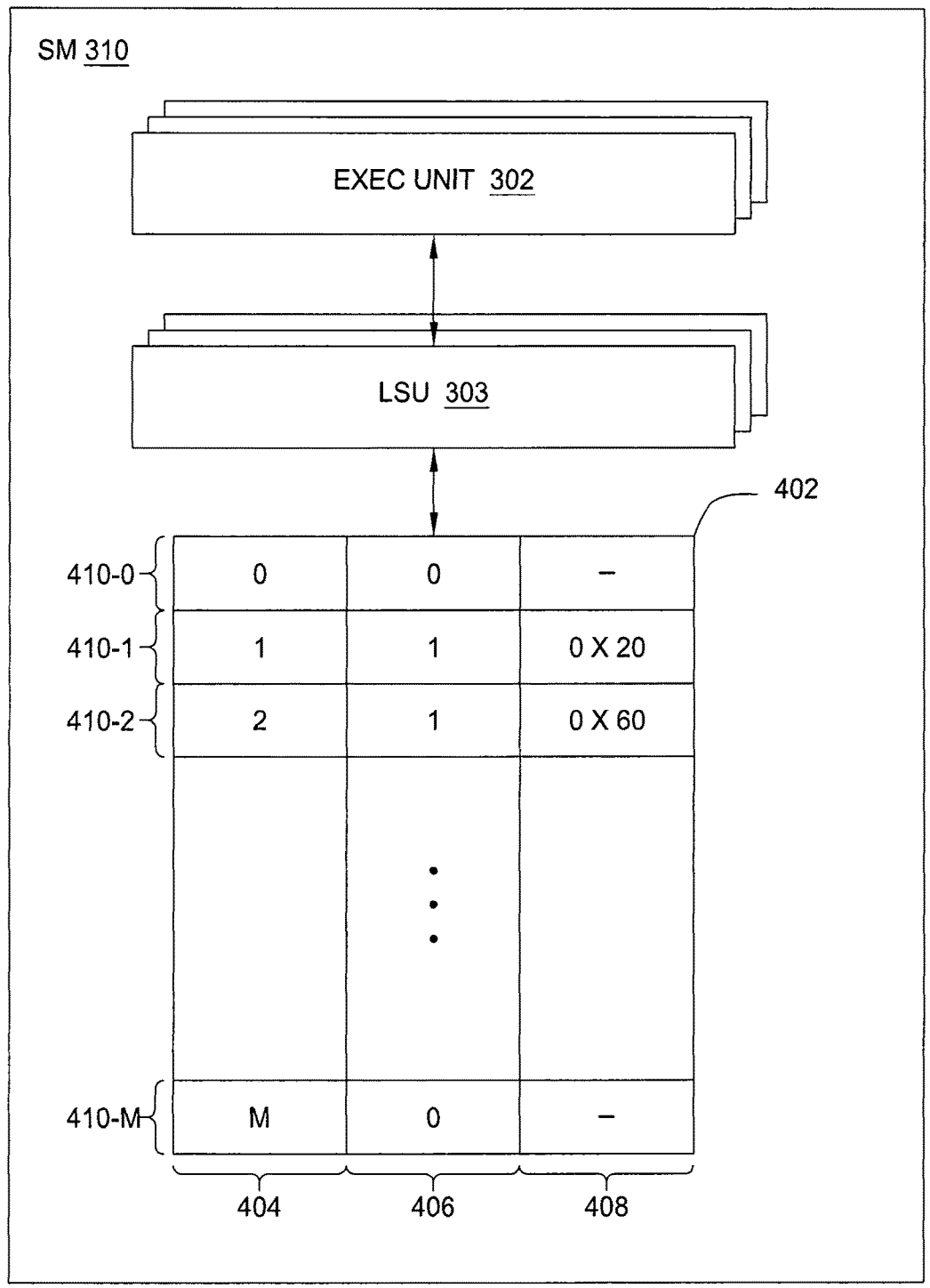
FIG. 4 is a conceptual diagram that illustrates the streaming multiprocessor of FIG. 3 in greater detail, according to one embodiment of the present invention.

FIG. 4 is a conceptual diagram that illustrates SM 310 of FIG. 3 in greater detail, according to one embodiment of the present invention. As shown, SM 310 includes one or more exec units 302 coupled to one or more LSUs 303, similar to those shown in FIG. 3C. Exec units 304 and LSUs 303 could be coupled together via, e.g., local register file 304 shown in FIG. 3. Thread groups within a CTA executing on SM 310 may perform various processing operations with exec units 302 and may perform various memory access operations with LSUs 303.

As previously mentioned, SM 310 is configured to suspend a CTA executing on SM 310 and to save the operating state of the suspended CTA by re-mapping local memory associated with thread groups within the suspended CTA to global memory. SM 310 is also configured to manage the re-mapped local memory using a pointer table, such as pointer table 402 shown in FIG. 4. As is shown, pointer table 402 includes rows 410. Each row 410 includes information related to a different thread group. Pointer table 402 also includes columns 404, 406, and 408. Column 404 includes indices of the thread groups configured to execute on SM 310, column 406 includes bits indicating whether local memory associated with those thread groups has been re-mapped to global memory, and column 408 includes pointers to locations in global memory for thread groups having local memory that has been re-mapped.

For a given row 410, column 404 includes an index of a particular thread group and column 406 includes a bit indicating whether local memory associated with that thread group has been re-mapped. When local memory associated with the thread group has been re-mapped, column 408 includes a pointer to the location in global memory where the re-mapped local memory resides. For example, row 410-2 includes within column 404 an index "2" that uniquely identifies a particular thread group. Row 410-2 includes within column 406 a "1" indicating that local memory associated with the thread group has been re-mapped, and includes within column 408 a pointer to the location in local memory where the re-mapped local memory resides, "0X60."

When suspending a CTA and saving the operating state of that CTA, LSU 303 within SM 310 is configured to re-map the local memory associated with each thread group within the CTA to global memory, as previously mentioned. For a given thread group, LSU 303 is configured to first determine whether local memory associated with that thread group has been re-mapped to global memory. In some situations, the global memory for a given thread group may have been previously re-mapped, e.g. when the operating state of that thread group was previously suspended. LSU 303 may determine whether local memory associated with the thread group has been re-mapped based on column 406 of the particular row 410 associated with the thread group.

In situations where local memory associated with the thread group has not been re-mapped, LSU 303 initiates an allocator for the thread group that allocates a portion of global memory for the local memory associated with the thread group. In one embodiment, the allocator is a software program derived from driver 103 shown in FIG. 1 and is configured to allocate a portion of a software-managed buffer residing within global memory. The allocator for the thread group returns a pointer to the allocated portion of global memory. LSU 303 may then copy the local memory associated with the thread group to the allocated portion of global memory. LSU 303 is configured to update pointer table 402 for the thread group to indicate that local memory associated with the thread group has been re-mapped, e.g. by setting a bit within column 406 of the row 410 corresponding to the thread group to a "1." LSU 303 is also configured to set column 408 of the row 410 corresponding to the thread group to include the pointer returned by the allocator. LSU 303 may repeat this process for each thread group within the CTA.

Subsequently, when restoring the operating state of the CTA, SM 310 is configured to re-launch threads within that CTA on the functional units within SM 310. For a given re-launched thread group, LSU 303 is configured to retrieve the pointer to the location in global memory where the re-mapped local memory associated with that thread group resides from the row 410 associated with that thread group. When performing load and store operations on behalf of the re-launched thread group, LSU 303 is configured to perform memory access operations with the updated LMEM base.

By implementing the techniques described above, SM 310 may suspend a CTA and save the operating state of that CTA, then restore that operating state at a later time. When restoring the operating state of a given thread group within the CTA, SM 310 is not required to re-copy local memory associated with that thread back to the original location of that local memory, thereby reducing the latency with which the operating state of a thread group can be restored. Accordingly, SM 310 is capable swapping the operating state of various CTAs in a more streamlined fashion compared to conventional techniques.

Figure 5:
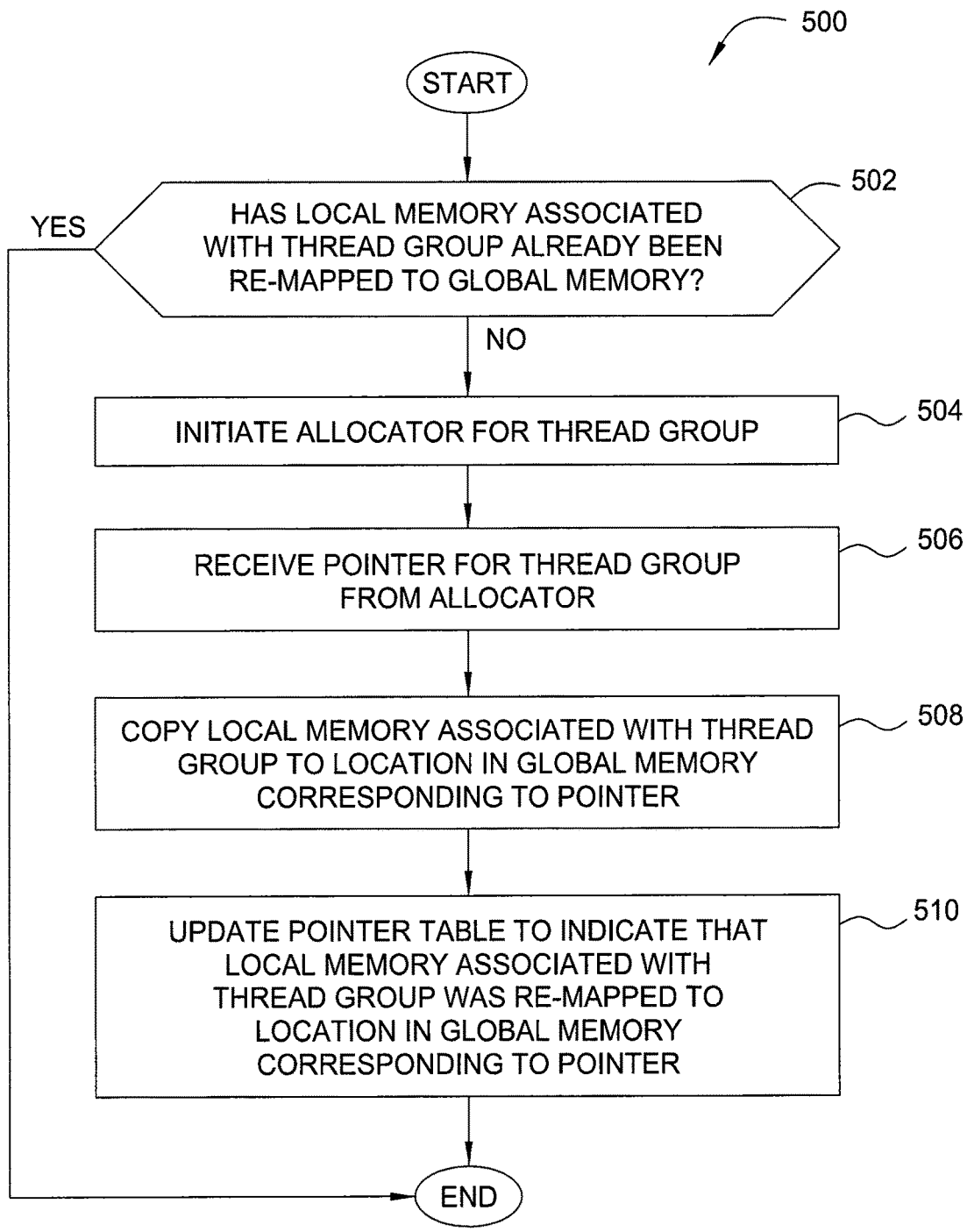
FIG. 5 is a flow diagram of method steps for saving the operating state of a thread group, according to one embodiment of the present invention.

FIG. 5 is a flow diagram of method steps for saving the operating state of a thread group, according to one embodiment of the present invention. Although the method steps are described in conjunction with the systems of FIGS. 1-4, persons of ordinary skill in the art will understand that any system configured to perform the method steps, in any order, is within the scope of the inventions.

As shown, a method 500 begins at step 502, where one of LSUs 303 within SM 310 of FIG. 3 determines whether local memory associated with a given thread group has already been re-mapped to global memory. The thread group may be included within a CTA executing on SM 310. If LSU 303 determines that the local memory associated with the thread group has already been re-mapped to global memory, then the method 500 ends. Otherwise, if LSU 303 determines that the local memory associated with the thread group has not been re-mapped to local memory, then the method 500 proceeds to step 504.

At step 504, LSU 303 initiates an allocator for the thread group. In one embodiment, the allocator is a software program derived from driver 103 shown in FIG. 1. The allocator is configured to allocate a region within global memory capable of storing the contents of the local memory associated with the thread group. In one embodiment, the allocator allocates a portion of a buffer for the thread group that resides within global memory and is associated with SM 310. At step 506, LSU 303 receives a pointer for the thread group from the allocator. The pointer represents a base address of the portion in global memory allocated to the thread group by the allocator at step 504.

At step 508, LSU 303 copies the local memory associated with the thread group to the location in global memory corresponding to the pointer returned by allocator at step 506. At step 510, LSU 303 updates a pointer table within SM 310, such as pointer table 402 shown in FIG. 4, to indicate that local memory associated with the thread group was re-mapped to global memory. LSU 303 is also configured to update the pointer table at step 510 to reflect the location in global memory to which the local memory was re-mapped. The method 500 then ends.

By implementing the method 500, LSU 303 is configured to re-map local memory associated with a thread group to global memory when saving the operating state of a CTA that includes the thread group. In practice, a different LSU 303 may perform the method 500 for each different thread group within the CTA when saving the operating state of the CTA as a whole.

Figure 6:
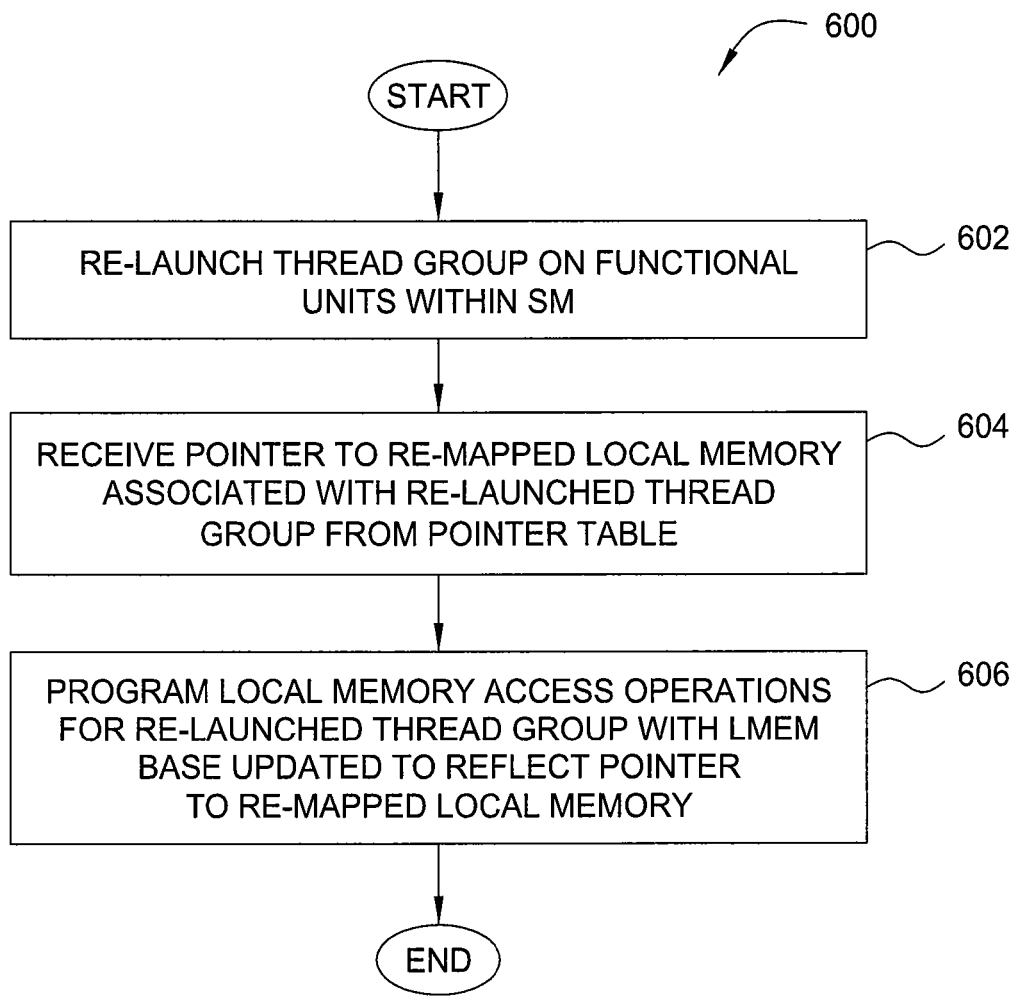
FIG. 6 is a flow diagram of method steps for restoring the operating state of a thread group, according to one embodiment of the present invention.

FIG. 6 is a flow diagram of method steps for restoring the operating state of a thread group, according to one embodiment of the present invention. Although the method steps are described in conjunction with the systems of FIGS. 1-4, persons of ordinary skill in the art will understand that any system configured to perform the method steps, in any order, is within the scope of the inventions.

As shown, a method 600 begins at step 602, where SM 310 re-launches a thread group on the functional units within SM 310. SM 310 may have previously suspended the CTA that included the thread group and, in doing so, saved the operating state of the thread group by re-mapping local memory associated with that thread group, e.g. by implementing the method 500 described above in conjunction with FIG. 5.

At step 604, one of LSUs 303 within SM 310 retrieves a pointer to the re-mapped local memory associated with the re-launched thread group from a pointer table, such as pointer table 402 shown in FIG. 4, within SM 310. At step 606, LSU 303 performs local memory access operations for the re-launched thread group with LMEM base updated to reflect the pointer to re-mapped local memory. The method 600 then ends.

By implementing the method 600, SM 310 is configured to re-launch a thread group within a CTA, and restore the operating state of that thread group by causing the thread group to perform memory access operations using re-mapped local memory. In practice, a different LSU 303 may perform the method 600 for each different thread group within the CTA when restoring the operating state of the CTA as a whole.

In sum, a streaming multiprocessor (SM) included within a parallel processing unit (PPU) is configured to suspend a thread group executing on the SM and to save the operating state of the suspended thread group. A load-store unit (LSU) within the SM re-maps local memory associated with the thread group to a location in global memory. Subsequently, the SM may re-launch the suspended thread group. The LSU may then perform local memory access operations on behalf of the re-launched thread group with the re-mapped local memory that resides in global memory.

Advantageously, when restoring the operating state of a thread group, the LSU is not required to copy the local memory associated with that thread group back to the SM, thereby conserving computational resources associated with the SM.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for saving an operating state associated with a group of threads executing on a processing engine, the method comprising:
    determining that a first portion of memory allocated to a first group of threads resides within a first memory region;
    allocating a second portion of memory within a second memory region;
    copying the first portion of memory to the second portion of memory;
    recording a pointer to the second portion of memory; and
    recording an indicator value indicating that the first portion of memory was copied to the second portion of memory,
    wherein the processing engine is configured to perform memory access operations associated with the first group of threads based on the pointer to the second portion of memory, and
    wherein the pointer corresponds to a base address of the second portion of memory, and a first thread within the first group of threads is configured to access the second portion of memory based on the base address and an offset associated with the first thread.

2. The computer-implemented method of claim 1, wherein the processing engine includes a table comprising a plurality of different entries, wherein each entry corresponds to a different group of threads, and recording the pointer to the second portion of memory comprises:
    identifying a first entry within the table that corresponds to the first group of threads;
    updating the first entry to reflect that the first portion of memory was copied to the second portion of memory; and
    updating the entry to indicate the pointer to the second portion of memory.

3. The computer-implemented method of claim 2, further comprising:
    retrieving the first entry within the table;

determining that the first entry reflects that the first portion of memory was copied to the second portion of memory;

accessing the pointer to the second portion of memory included in the first entry; and performing a memory access operation associated with the first group of threads based on the pointer.

4. The computer-implemented method of claim 1, wherein the first memory region comprises a local memory resource managed by the processing engine.

5. The computer-implemented method of claim 1, wherein the second memory region comprises a global memory resource.

6. The computer-implemented method of claim 5, wherein the second portion of memory comprises a buffer that is allocated and managed by a software application executing on the processing engine.

7. The computer-implemented method of claim 6, wherein the pointer to the second portion of memory corresponds to a base address within the buffer, and a given thread within the group of threads is configured to access a portion of the buffer corresponding to the given thread based on the base address and based on an offset associated with the given thread.

8. The computer-implemented method of claim 1, wherein the processing engine is included within a set of processing engines that resides within a parallel processing unit and is configured to execute one or more groups of threads simultaneously.

9. A non-transitory computer-readable medium storing program instructions that, when executed by a processor, cause the processor to save an operating state associated with a group of threads executing on a processing engine by performing the steps of:

determining that a first portion of memory allocated to a first group of threads resides within a first memory region, wherein the first portion of memory includes a first operating state associated with the first group of threads;

upon suspending execution of the first group of threads, allocating a second portion of memory within a second memory region;

copying the first portion of memory, including the first operating state, to the second portion of memory;

recording a pointer to the second portion of memory; and upon resuming execution of the first group of threads, performing one or more memory access operations using the pointer to the second portion of memory to access the first operating state associated with the first group of threads.

10. The non-transitory computer-readable medium of claim 9, wherein the processing engine includes a table comprising a plurality of different entries, wherein each entry corresponds to a different group of threads, and recording the pointer to the second portion of memory comprises:

identifying a first entry within the table that corresponds to the first group of threads;

updating the first entry to reflect that the first portion of memory was copied to the second portion of memory; and updating the entry to indicate the pointer to the second portion of memory.

11. The non-transitory computer-readable medium of claim 10, further comprising the steps of:

retrieving the first entry within the table;

determining that the first entry reflects that the first portion of memory was copied to the second portion of memory;

accessing the pointer to the second portion of memory included in the first entry; and performing a memory access operation associated with the first group of threads based on the pointer.

12. The non-transitory computer-readable medium of claim 9, wherein the first memory region comprises a local memory resource managed by the processing engine.

13. The non-transitory computer-readable medium of claim 9, wherein the second memory region comprises a global memory resource.

14. The non-transitory computer-readable medium of claim 13, wherein the second portion of memory comprises a buffer that is allocated and managed by a software application executing on the processing engine.

15. The non-transitory computer-readable medium of claim 14, wherein the pointer to the second portion of memory corresponds to a base address within the buffer, and a given thread within the group of threads is configured to access a portion of the buffer corresponding to the given thread based on the base address and based on an offset associated with the given thread.

16. The non-transitory computer-readable medium of claim 9, wherein the processing engine is included within a set of processing engines that resides within a parallel processing unit and is configured to execute one or more groups of threads simultaneously.

17. A computing device configured to save an operating state associated with a group of execution threads, comprising:

a memory including instructions; and a processor coupled to the memory and including one or more processor cores, wherein at least one processor core, upon executing the instructions, is configured to:

determine that a first portion of memory allocated to a first group of threads resides within a first memory region, wherein the first portion of memory includes a first operating state associated with the first group of threads;

upon suspending execution of the first group of threads, allocate a second portion of memory within a second memory region;

copy the first portion of memory, including the first operating state, to the second portion of memory;

record a pointer to the second portion of memory; and upon resuming execution of the first group of threads, perform memory access operations using the pointer to the second portion of memory to access the first operating state associated with the first group of threads.

18. The computing device of claim 17, wherein the processor core includes a table comprising a plurality of different entries, wherein each entry corresponds to a different group of threads, and the processor core records the pointer to the second portion of memory by:

identifying a first entry within the table that corresponds to the first group of threads;

updating the first entry to reflect that the first portion of memory was copied to the second portion of memory; and updating the entry to indicate the pointer to the second portion of memory.

19. The computing device of claim 18, wherein the processor core is further configured to:

retrieve the first entry within the table;

determine that the first entry reflects that the first portion of memory was copied to the second portion of memory;

access the pointer to the second portion of memory included in the first entry; and perform a memory access operation associated with the first group of threads based on the pointer.

20. A computer-implemented method for saving an operating state associated with a group of threads executing on a processing engine, the method comprising:

determining that a first portion of memory allocated to a first group of threads resides within a first memory region, wherein the first portion of memory includes a first operating state associated with the first group of threads;

upon suspending execution of the first group of threads, allocating a second portion of memory within a second memory region comprising a global memory resource;

copying the first portion of memory, including the first operating state, to the second portion of memory;

recording a pointer to the second portion of memory; and upon resuming execution of the first group of threads, performing memory access operations using the pointer to the second portion of memory to access the first operating state associated with the first group of threads.

21. A computer-implemented method for saving an operating state associated with a group of threads executing on a processing engine, the method comprising:

determining that a first portion of memory allocated to a first group of threads resides within a first memory region;

allocating a second portion of memory within a second memory region;

copying the first portion of memory to the second portion of memory;

recording a pointer to the second portion of memory, wherein the processing engine is configured to perform memory access operations associated with the first group of threads based on the pointer to the second portion of memory, wherein the processing engine includes a table comprising a plurality of different entries, wherein each entry corresponds to a different group of threads, and recording the pointer to the second portion of memory comprises:

identifying a first entry within the table that corresponds to the first group of threads;

updating the first entry to reflect that the first portion of memory was copied to the second portion of memory; and updating the entry to indicate the pointer to the second portion of memory;

retrieving the first entry within the table;

determining that the first entry reflects that the first portion of memory was copied to the second portion of memory;

accessing the pointer to the second portion of memory included in the first entry; and performing a memory access operation associated with the first group of threads based on the pointer.

22. The computer-implemented method of claim 1, wherein the indicator value is stored to a pointer table managed by a streaming multiprocessor that manages re-mapped memory for a plurality of groups of threads.

23. The computer-implemented method of claim 22, wherein the pointer table is stored to an internal data storage of the streaming multiprocessor.

24. The computing device of claim 17, wherein the pointer corresponds to a base address of the second portion of memory, and, upon resuming execution of the first group of threads, a first thread within the first group of threads is configured to access the second portion of memory based on the base address and an offset associated with the first thread.

25. The computer-implemented method of claim 20, wherein the pointer corresponds to a base address of the second portion of memory, and, upon resuming execution of the first group of threads, a first thread within the first group of threads is configured to access the second portion of memory based on the base address and an offset associated with the first thread.

26. The non-transitory computer-readable medium of claim 9, wherein the pointer corresponds to a base address of the second portion of memory and, upon resuming execution of the first group of threads, a first thread within the first group of threads is configured to access the second portion of memory based on the base address and an offset associated with the first thread.

27. The non-transitory computer-readable medium of claim 26, further comprising the step of recording an indicator value indicating that the first portion of memory was copied to the second portion of memory.

28. The computing device of claim 24, wherein the at least one processor core is further configured to record an indicator value indicating that the first portion of memory was copied to the second portion of memory.

* * * * *